United States Patent
Chu (10) Patent No.: US 10,468,012 B2
(45) Date of Patent: Nov. 5, 2019

(54) HOMOGENEOUS HARD SPEAKER RADIATING DIAPHRAGMS WITH DAMPING

(71) Applicant: BDNC (HOLDING) LIMITED, Hong Kong (CN)

(72) Inventor: Walter Ka Wai Chu, Hong Kong (CN)

(73) Assignee: BDNC (HOLDING) LIMITED, Hong Kong (CN)

( * ) Notice: Subject to any disclaimer, the term of this patent is extended or adjusted under 35 U.S.C. 154(b) by 351 days.

(21) Appl. No.: 15/673,554

(22) Filed: Aug. 10, 2017

(65) Prior Publication Data
US 2018/0130458 A1   May 10, 2018

(30) Foreign Application Priority Data
Nov. 4, 2016   (TW) .............................. 105135888 A (51) Int. Cl.
*G10K 13/00*   (2006.01)
*H04R 7/06*   (2006.01)
(Continued)

(52) U.S. Cl.
CPC ........... *G10K 13/00* (2013.01); *H04R 31/003* (2013.01)

(58) Field of Classification Search
CPC . G10K 13/00; H04R 7/00; H04R 7/02; H04R 7/04; H04R 7/06; H04R 7/10;
(Continued)

(56) References Cited

U.S. PATENT DOCUMENTS 2,905,260 A * 9/1959 Williams ............... H04R 7/122
                                                                  181/167
3,596,733 A * 8/1971 Bertagni ................. H04R 7/04
                                                                  381/431
(Continued)

FOREIGN PATENT DOCUMENTS

| GB | 2176673 A | * 12/1986 | ............... H04R 7/10 |
| WO | 2013181484 | 12/2013 | |
| WO | 2016044361 | 3/2016 | |

OTHER PUBLICATIONS

European Patent Office, "European search report", dated Mar. 1, 2018.

*Primary Examiner* — Edgardo San Martin
(74) *Attorney, Agent, or Firm* — WPAT, PC (57) ABSTRACT

A compressed skins-tensioned core structure includes a first surface region; a second surface region; a core between the first surface region and the second surface region; a first transition region continuous with the first surface region at a side, and continuous with the core at another side; and a second transition region continuous with the core at a side, and continuous with the second surface region at another side, wherein each of the first surface region, the second surface region, the core, the first transition region and the second transition region is formed of a substantially homogeneous amorphous material; each of the first surface region and the second surface region exhibits an internal compressive stress, the core exhibits an internal tensile stress, and each of the first transition region and the second transition region exhibits a stress gradient from the internal compressive stress to the internal tensile stress.

16 Claims, 10 Drawing Sheets

400

(51) Int. Cl.
*H04R 31/00* (2006.01)
*H04R 7/04* (2006.01)

(58) Field of Classification Search
CPC .......... H04R 7/122; H04R 7/125; H04R 7/14; H04R 7/045; H04R 2307/025
See application file for complete search history.

(56) References Cited

U.S. PATENT DOCUMENTS

| | | | | |
|---|---|---|---|---|
| 4,395,597 A * | 7/1983 | Suzuki | .................... | H04R 7/12 181/170 |
| 4,470,479 A * | 9/1984 | Inoue | .................... | G10K 13/00 181/168 |
| 5,619,019 A * | 4/1997 | Yoshimura | ............... | H04R 7/26 181/166 |
| 6,151,402 A | 11/2000 | Azima et al. | | |
| 6,282,298 B1 * | 8/2001 | Azima | .................... | G07F 9/02 381/423 |
| 7,332,215 B2 * | 2/2008 | Tokura | .................... | B32B 5/18 428/318.8 |
| 7,344,001 B2 * | 3/2008 | Inoue | .................... | H04R 7/10 181/167 |
| 8,182,905 B2 * | 5/2012 | Kmetz | .................... | B32B 18/00 428/212 |
| 8,243,979 B2 * | 8/2012 | Yu | .................... | H04R 9/045 381/396 |
| 8,976,997 B1 | 3/2015 | Hecht et al. | | |
| 10,081,533 B2 * | 9/2018 | Schmid | ............... | B81C 1/00142 |
| 2004/0189151 A1 * | 9/2004 | Athanas | .................... | H04R 17/00 310/328 |
| 2008/0006475 A1 * | 1/2008 | Imanishi | .................... | H04R 7/12 181/167 |
| 2010/0009154 A1 | 1/2010 | Allan et al. | | |
| 2014/0370244 A1 * | 12/2014 | Kinoshita | ............. | C03C 21/002 428/177 |
| 2018/0109893 A1 * | 4/2018 | Chu | .................... | H04R 31/006 |

\* cited by examiner

HOMOGENEOUS HARD SPEAKER RADIATING DIAPHRAGMS WITH DAMPING

FIELD OF THE INVENTION

The present invention relates to a diaphragm structure, and more particularly to a diaphragm structure for use in a speaker.

BACKGROUND OF THE INVENTION

A speaker is a device for converting an electrical audio signal into a corresponding sound. A variety of speakers have been developed and continue to be improved since the nineteenth century.

In general, an electrodynamic, direct-radiating speaker is mainly composed of a magnetic circuit assembly, a voice-coil partially or wholly inside the magnetic circuit assembly, and a sound-radiating diaphragm mechanically attached to the voice-coil; and in most cases, together with other supporting parts like the diaphragm surround, suspension, also referred to as the spider or the suspension, frame, etc. As a magnetic field resulting from the alternating current flowing through the coil interacts with a magnetic field from the magnetic-circuit assembly according to Fleming's rules, the voice-coil actuates the attached portion of the diaphragm, thus the portion of the diaphragm vibrates, and propagates such vibration to the rest of the diaphragm area not directly attached to the voice-coil. As a result, the sound radiates from the whole diaphragm area in a very complex manner due to the frequency-dependent and non-linearity in the sound-propagation, absorption (damping), and boundary reflection process. Therefore, the material, structure and configuration of the diaphragm significantly influences the sound quality of the speaker.

SUMMARY OF THE INVENTION

The present invention provides a diaphragm structure, based upon an amorphous compressed skins-tensioned core structure, for use in a speaker, which can be implemented in various ways to achieve satisfactory sound quality.

The present invention provides a compressed skins-tensioned core structure including: a first surface region; a second surface region; a core between the first surface region and the second surface region; a first transition region continuous with the first surface region at a side, and continuous with the core at another side; and a second transition region continuous with the core at a side, and continuous with the second surface region at another side, wherein each of the first surface region, the second surface region, the core, the first transition region and the second transition region is formed of a substantially homogeneous amorphous material; each of the first surface region and the second surface region exhibits an internal compressive stress, the core exhibits an internal tensile stress, and each of the first transition region and the second transition region exhibits a stress gradient from the internal compressive stress to the internal tensile stress.

The present invention also provides a composite diaphragm for a speaker, comprising: a first facesheet; a second facesheet; and a low-density core disposed between the first facesheet and the second facesheet, wherein at least one of the first facesheet and the second facesheet is a compressed skins-tensioned core having the structure as described above.

The present invention further provides a composite diaphragm for a speaker, comprising: a first facesheet; a second facesheet; and a corrugated compressed skins-tensioned core disposed between the first facesheet and the second facesheet, wherein at least one of the first facesheet and the second facesheet is a compressed skins-tensioned core having the structure as described above. Preferably, the corrugated core includes a plurality of first supporting portions, a plurality of second supporting portions, and a plurality of connecting portions, wherein the first supporting portions are adhered to the first facesheet, the second supporting portions are adhered to the second facesheet, and each of the connecting portions connects one of the first supporting portions to one of the second supporting portions to isolate the first supporting portions from the second facesheet and/or isolate the second supporting portions from the first facesheet.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a variety of novel designs useful in the realization of diaphragms that have significant performance advantages over other types of diaphragms used in speakers.

As known, there is energy loss when sound travels from one medium to another medium with a different acoustic impedance, even if the densities of the two media are approximately the same. Carefully managed energy loss is advantageous in achieving good sound quality. Therefore, this concept of controlled energy loss, or damping to which it is often referred, may be advantageously applied in the design of the diaphragm structure of a speaker.

Figure 1:
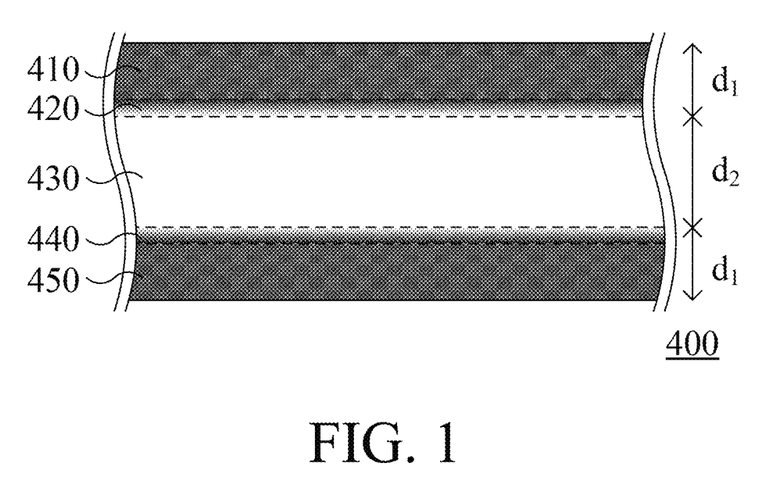
FIG. 1 is a cross-sectional view schematically illustrating an amorphous compressed skins-tensioned core of a speaker according to an embodiment of the present invention.

Please refer to FIG. 1, in which a cross-sectional view schematically illustrates an amorphous compressed skins-tensioned core structure that can serve as a diaphragm in its entity or as a component of the diaphragm of a speaker according to an embodiment of the present invention. The amorphous compressed skins-tensioned core structure 400 includes an upper surface layer 410, an upper transition layer 420, a core 430, a lower transition layer 440 and a lower surface layer 450, and each layer comprises substantially the same hard homogeneous amorphous material with variations in internal stress resulting from the density distribution of guest ions in the upper surface layer 410, upper transition layer 420, lower transition layer 440, and lower surface layer 450, which vary by depth from the skin, as a result of chemical ion exchange occurring when the untreated piece of glass is immersed in a high temperature molten salt bath creating the compressive stress layer 410 and 450, and the corresponding transition layer 420 and 440, and compensating tension in the core 430, forming the amorphous compressed skins-tensioned core structure 400 according to the present invention. The stress distribution causes variation of acoustic impedance throughout the medium. The impedance variation throughout the medium results in losses of energy as sound travels through the medium, such energy loss, as long as being well controlled, results in optimize sound quality.

If the upper surface layer 410, the upper transition layer 420, the central layer 430, the lower transition layer 440 and the lower surface layer 450 are made of the same hard homogeneous amorphous material with different internal stress parameters, the stress distribution would make sound travel with different velocity-of-sound and/or acoustic-impedance through such a medium. Since the physical vibration properties of the diaphragm layers are differentiated so as to result in some energy loss, the energy loss, as long as being well controlled, would optimize sound quality.

According to an embodiment of the present invention, it is preferred that the upper surface layer 410 and the lower surface layer 450 have similar amounts of internal compressive stress, and the core 430 exhibits compensating internal tensile stress. As for the upper transition layer 420 between the upper surface layer 410 and the core 430, and the lower transition layer 440 between the lower surface layer 450 and the core 430, they do not have constant amount of stress throughout the layer, but instead, exhibit a stress gradient from the internal compressive stress to internal tensile stress of the core.

The upper transition layer 420 has maximal internal compressive stress at the region approaching the upper surface layer 410, which approximates the internal compressive stress of the upper surface layer 410, and has maximal internal tensile stress at the region approaching the core 430, which compensates the internal tensile stress of the core 430. Likewise, the lower transition layer 440 has maximal internal compressive stress at the region approaching the lower surface layer 450, which compensates the internal compressive stress of the lower surface layer 450, and has maximal internal tensile stress at the region approaching the core 430, which approximates the internal tensile stress of the core layer 430. It is to be noted that the amorphous compressed skins-tensioned core structure layers are defined with dash lines in FIG. 1 as they do not have clear boundaries. By way of repetitive experiments, the inventor found the graded compression-tension boundaries help enhance sound quality.

Furthermore, for providing better sound quality, the overall thickness of the amorphous compressed skins-tensioned core structure 400 is preferably ranged between 25 μm and 850 μm. Specifically, the thickness $d_1$ of the upper surface layer 410 plus the upper transition layer 420 or the lower surface layer 450 plus the lower transition layer 440 is preferably ranged between 1 μm and 40 μm, and the thickness $d_2$ of the core 430 is preferably ranged between 20 μm and 800 μm.

Hereinafter, embodiments of the diaphragm structure according to the present invention will be illustrated in more detail with reference to drawings. The embodiments are given for example only rather than for confining the implementation and the scope of the invention.

Figure 2A:
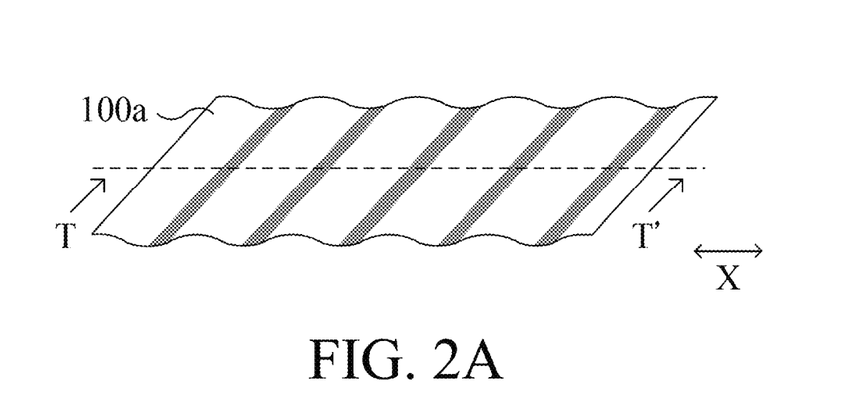
FIG. 2A is a schematic diagram illustrating a first configuration of a diaphragm structure of a speaker according to the present invention.
Figure 2B:
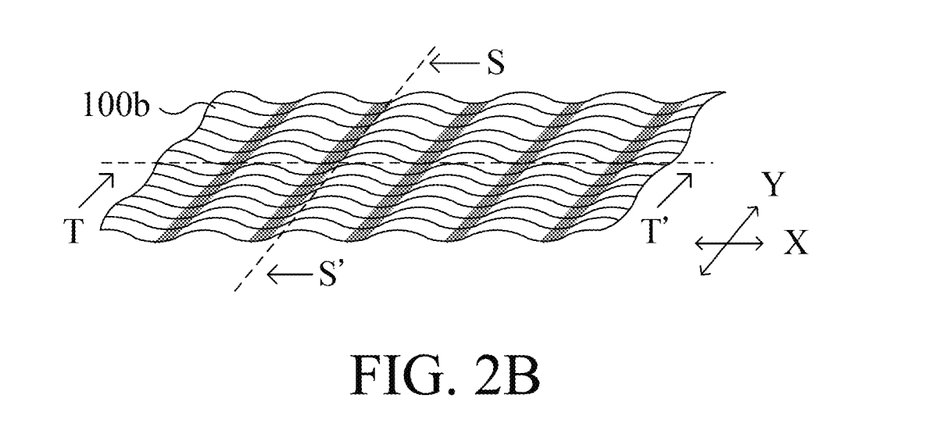
FIG. 2B is a schematic diagram illustrating a second configuration of a diaphragm structure of a speaker according to the present invention.
Figure 2C:
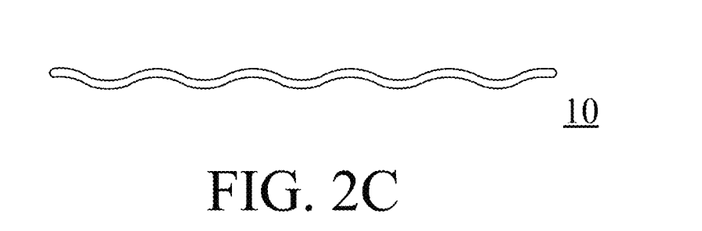
FIG. 2C is a cross-sectional view of the diaphragm structure as illustrated in FIG. 2A or 2B, which is taken along a line T-T'.

Please refer to FIG. 2A and FIG. 2B, in which two embodiments of diaphragm structure according to the present invention are schematically illustrated. In these embodiments, both the diaphragms have a wavy structure, wherein the diaphragm structure as shown in FIG. 2A fluctuates along only the X-axis, while the diaphragm structure as shown in FIG. 2B fluctuates along both the X-axis and the Y-axis. FIG. 2C schematically illustrates a cross-sectional view of the diaphragm structure as illustrated in FIG. 2A or 2B, which is taken along a line T-T'. The diaphragm 100a as illustrated in FIG. 2A and the diaphragm 100b as illustrated in FIG. 2B, for example, may be a continuous rectangular or any other suitably shaped sheet of substantially homogeneous amorphous material. Amplitude-reduction or wavelength-extension designs may be provided at edges of the diaphragms 100a and 100b, where the diaphragm may be coupled to a voice coil, or the edges are made flat in order to facilitate the coupling of the diaphragm to other elements of the speaker.

It is to be noted that the diaphragm 100a as illustrated in FIG. 2A and the diaphragm 100b as illustrated in FIG. 2B are exemplified, but not limited, to be rectangular. According to practical designs and requirements, the contours of the diaphragms 100a and 100b may be otherwise shaped. For example, it may be formed as an obround, a circle, an oval or ellipsoid, or any other suitable shape.

Figure 2D:
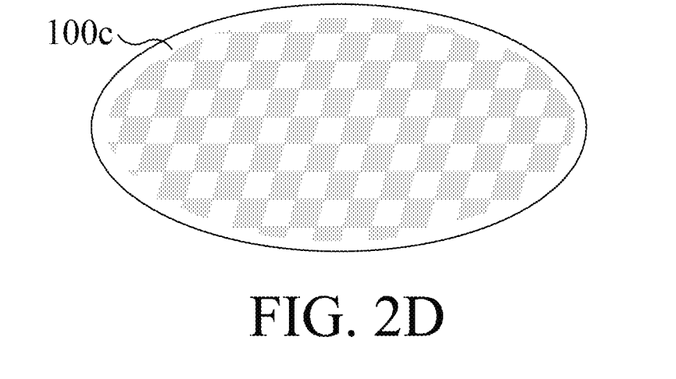
FIG. 2D is a schematic diagram illustrating a third configuration of a diaphragm structure of a speaker according to the present invention.
Figure 2E:
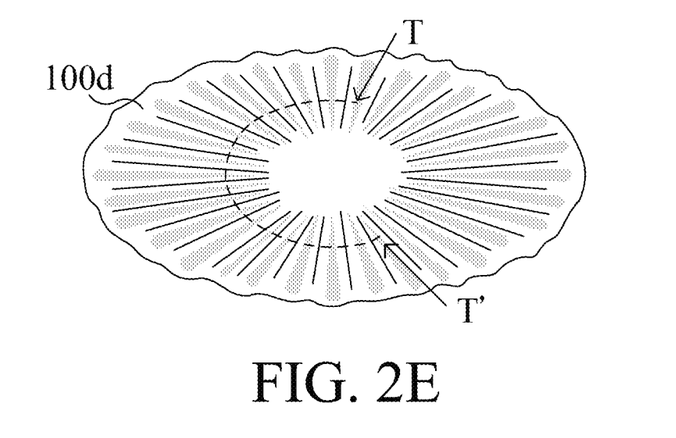
FIG. 2E is a schematic diagram illustrating a fourth configuration of a diaphragm structure of a speaker according to the present invention.
Figure 2F:
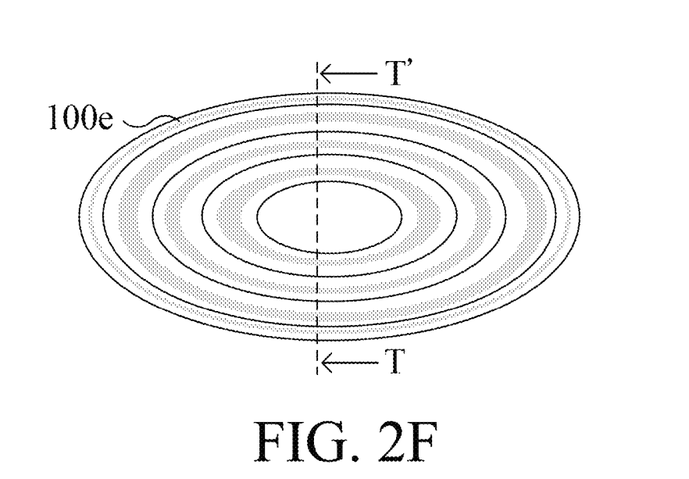
FIG. 2F is a schematic diagram illustrating a fifth configuration of a diaphragm structure of a speaker according to the present invention.

FIGS. 2D-2F exemplify a variety of circular diaphragms. The diaphragm 100c as illustrated in FIG. 2D has a circular outline, and fluctuates along both the X-axis and the Y-axis. The distribution of the shaded and blank blocks shown in FIG. 2D schematically indicate the topographic feature of the diaphragm. In this example, the X-axis and the Y-axis are orthogonal to each other. Alternatively, the X-axis and the Y-axis may have any suitable included angle therebetween. In further examples, the diaphragm may fluctuate in more than two directions. Likewise, amplitude-reduction or wave-length-extension designs may be provided at an edge or edges of the diaphragm 100c, where the diaphragm may be coupled to a voice coil, or the edge or edges are made flat in order to facilitate the coupling of the diaphragm to other elements of the speaker.

Please refer to FIG. 2E, in which a diaphragm 100d is schematically illustrated. The diaphragm 100d has a circular outline, and fluctuates around its central axis, e.g. along the circumferential T-T'-line direction. On the other hand, the diaphragm 100e as illustrated in FIG. 2F has a circular outline, and fluctuates along radial directions. In these examples, the diaphragms 100d and 100e are sheet-like shaped. Alternatively, the diaphragms 100d and 100e may be made stereoscopic. For example, the diaphragms 100d and 100e may be cone-shaped or dome-shaped.

Figure 3A:
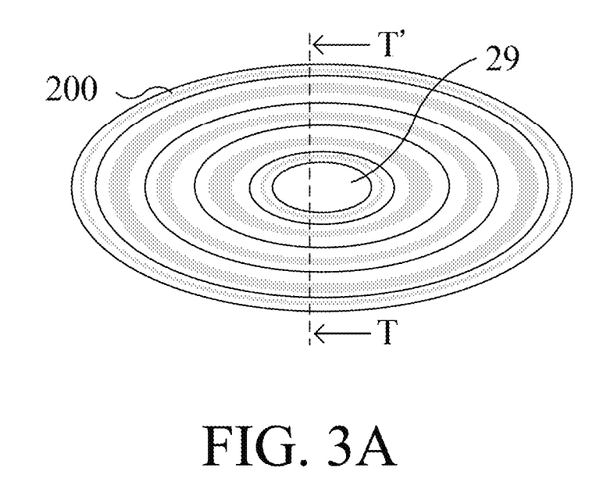
FIG. 3A is a schematic diagram illustrating a sixth configuration of a diaphragm structure of a speaker according to the present invention.
Figure 3B:
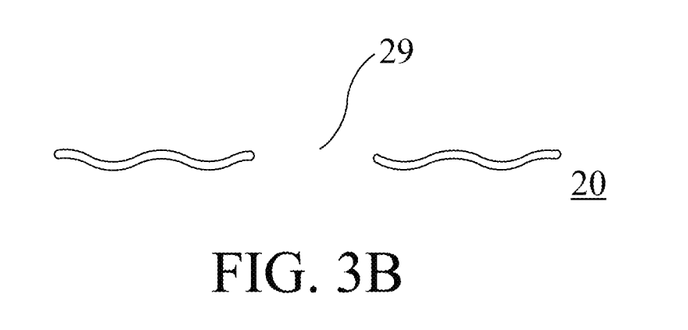
FIG. 3B is a schematic a cross-sectional view of the diaphragm structure as illustrated in FIG. 3A, which is taken along a line T-T'.
Figure 4:
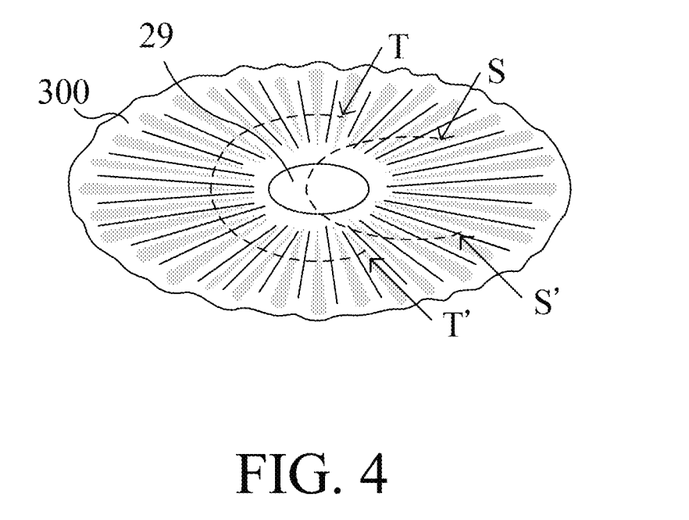
FIG. 4 is a schematic diagram illustrating a seventh configuration of a diaphragm structure of a speaker according to the present invention.

Please refer to FIGS. 3A and 3B, in which an alternative configuration of diaphragm structure is schematically illustrated. In this embodiment, the diaphragm 200 differs from the diaphragm 100e as illustrated in FIG. 2F in that the diaphragm 200 has a central hole 29 at the area where the diaphragm is coupled to a voice-coil. Likewise, a central hole may also be provided in the diaphragm 100a, 100b, 100c or 100d to form an alternative diaphragm structure. The side view of a hollow diaphragm structure is schematically illustrated in FIG. 3B. FIG. 4 schematically illustrates a diaphragm structure 300 formed by creating a central hole 29 in the diaphragm 100d as illustrated in FIG. 2E, wherein the cross-sectional view taken along the T-T' line is like the cross-sectional view as shown in FIG. 2C, and the cross-sectional view taken along the S-S' line is line the cross-sectional view as shown in FIG. 3B. The presence of the central hole 29 makes the continuous wavy structure break at the area where the diaphragm is coupled to a voice-coil.

Figure 5A:
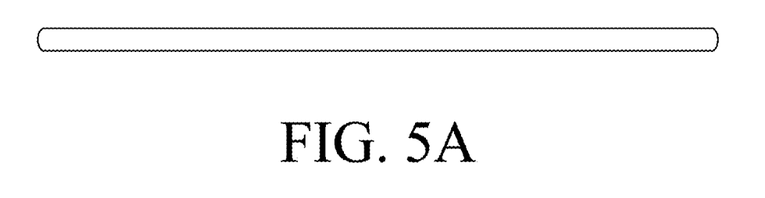
FIGS. 5A~5E are schematic side views and FIGS. 5F and 5G are schematic perspective views, each exemplifying a design of a diaphragm structure of a speaker according to the present invention.
Figure 5B:
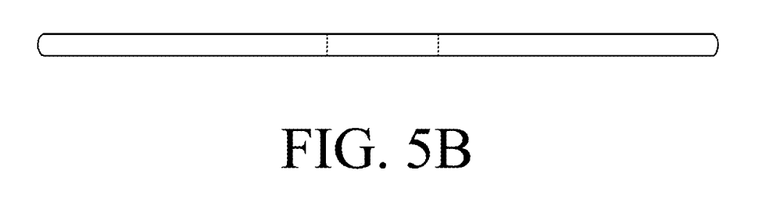
Figure 5C:
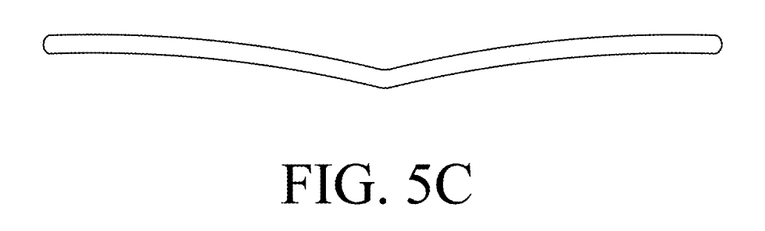
Figure 5D:
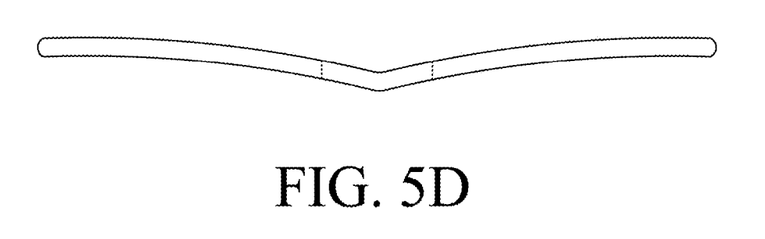
Figure 5E:
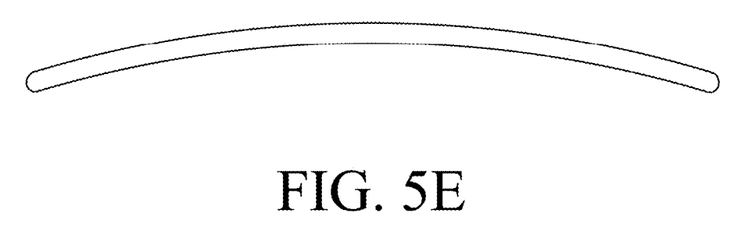
Figure 5F:
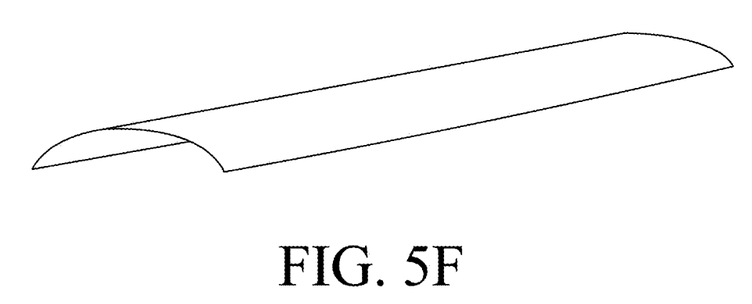
Figure 5G:
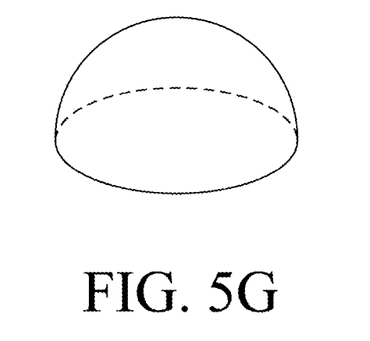

In the above embodiments and examples shown in the drawings, the diaphragms are rectangular or circular flat sheets with or without central holes. Alternatively, as mentioned above, the diaphragm may be formed as an obround, a circle, an oval or ellipsoid, polygon or any other suitable shape. FIGS. 5A-5E schematically exemplify the variations of the diaphragm structures in side views. In addition, the diaphragms may be cone-shaped, dome-shaped or tunnel-shaped, as exemplified by the schematic perspective views shown in FIGS. 5F and 5G.

Figure 6A:
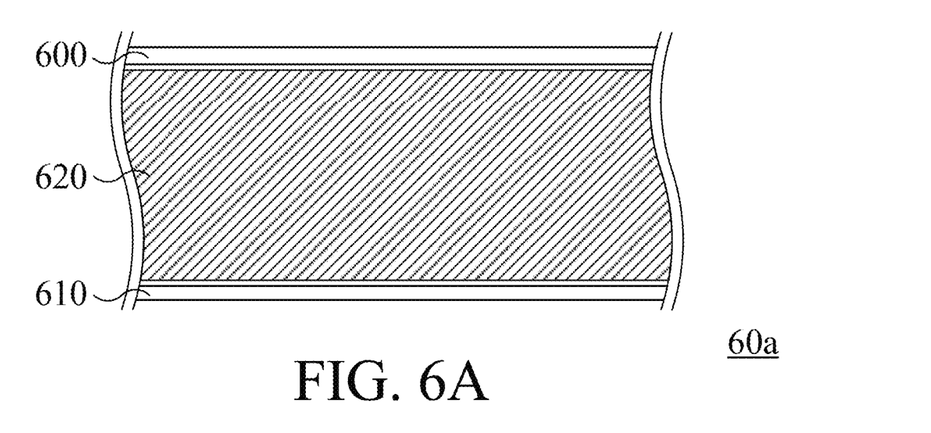
FIG. 6A is a cross-sectional view schematically illustrating a diaphragm structure of a speaker according to another embodiment of the present invention.
Figure 6B:
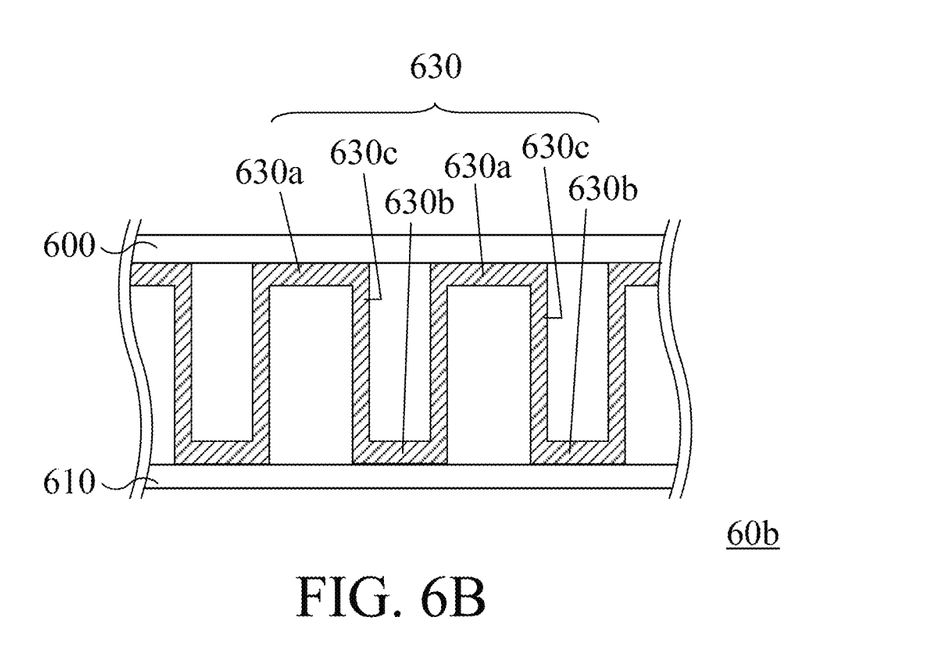
FIG. 6B is a cross-sectional view schematically illustrating a diaphragm structure of a speaker according to a further embodiment of the present invention.

In other embodiments, a diaphragm according to the present invention has a composite structure, as illustrated in FIGS. 6A and 6B. The diaphragm 60a as illustrated in FIG. 6A includes a first facesheet 600, a second facesheet 610 and a low-density core 620 between the first and second facesheets 600 and 610. In this embodiment, the first and second facesheets 600 and 610 can be implemented with one of the facesheets described above with reference to FIGS. 1-5 and their equivalent variants. Alternatively, only one of the first and second facesheets is formed of a hard and substantially homogeneous amorphous material, and the other may be formed of, for example, aluminum foil, polymer film, carbon fiber, or any other suitable material conventionally used as a diaphragm material for a speaker.

The low-density core 620 may be made of a material whose density is lower than the first facesheet 600 and the second facesheet 610, e.g. polymethacrylimide foam (PMI form), Balsa wood, epoxy with a glass microspheres filler, etc., for reducing the overall weight of the composite diaphragm 60a. The first and second facesheets 600 and 610 are attached onto the low-density core 620 with an adhesive.

The diaphragm 60b as illustrated in FIG. 6B has a structure similar to the diaphragm 60a as illustrated in FIG. 6A. In other words, it also includes a first facesheet 600 and a second facesheet 610. Nevertheless, the diaphragm 60b includes a corrugated core 630 between the first and second facesheets 600 and 610 instead of a low-density core. As shown in FIG. 6B, the corrugated core 630 includes a plurality of first supporting portions 630a, a plurality of second supporting portions 630b, and a plurality of connecting portions 630c. The first supporting portions 630a are adhered to the first facesheet 600, the second supporting portions 630b are adhered to the second facesheet 610, and each of the connecting portions 630c connects one of the first supporting portions 630a to one of the second supporting portions 630b to isolate the first supporting portions 630a from the second facesheet 610 and/or isolate the second supporting portions 630b from the first facesheet 600. The corrugated core 630, for example, may be made of aluminum foil, a sheet of paper, polymer film, or any other suitable material.

Figure 7A:
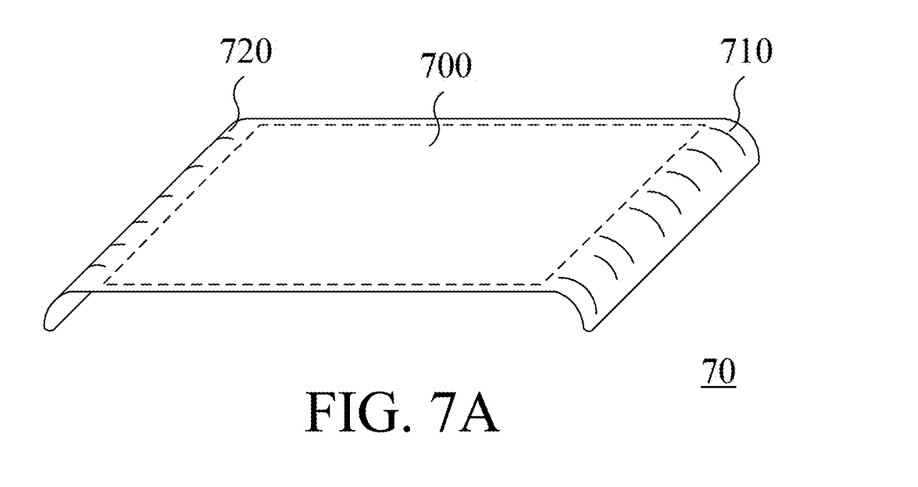
FIG. 7A is a schematic diagram illustrating an eighth configuration of a diaphragm structure of a speaker according to the present invention.
Figure 7B:
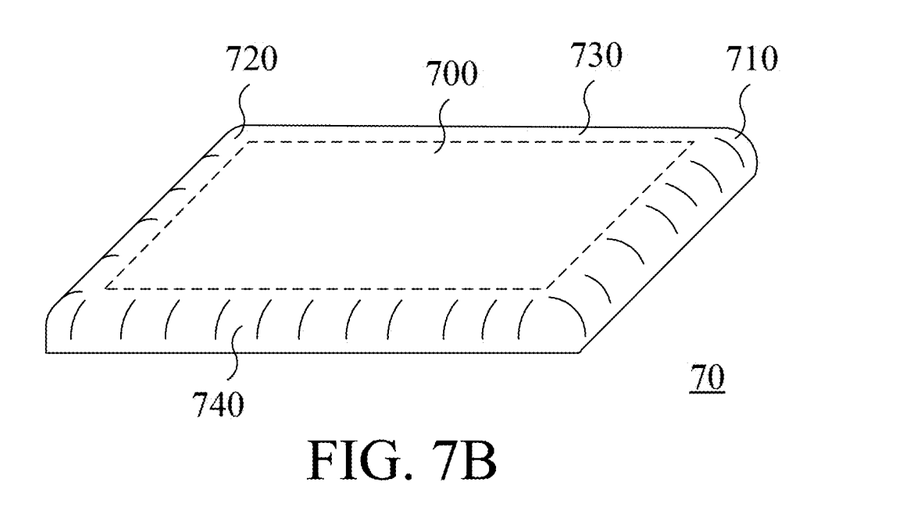
FIG. 7B is a schematic diagram illustrating a ninth configuration of a diaphragm structure of a speaker according to the present invention.

FIG. 7A and FIG. 7B further exemplify configurations of diaphragm structures according to the present invention. In the embodiment illustrated in FIG. 7A, a diaphragm 70 includes a central flat region 700 and a set of bent regions 710 and 720 disposed at opposite sides of the central flat region 700. The diaphragm 70 may be a single diaphragm structure or a composite diaphragm structure as described above. Alternatively, the diaphragm 70 may further include another set of bent regions 730 and 740 disposed at other opposite sides of the central flat region 700. Since a thinned and lightened large-area diaphragm might suffer from warping, the bent regions 710, 702, 730 and/or 740 are provided for enhancing the stiffness of the structure so as to remedy the resulting problems. The contours of the diaphragms as shown are exemplified to be rectangular. Nevertheless, other polygons or other shapes may be adapted for implementation. Furthermore, the number, positions and configurations of the bent regions are not limited to the examples shown in the figures as long as the object of stiffness enhancement can be achieved.

Figure 8:
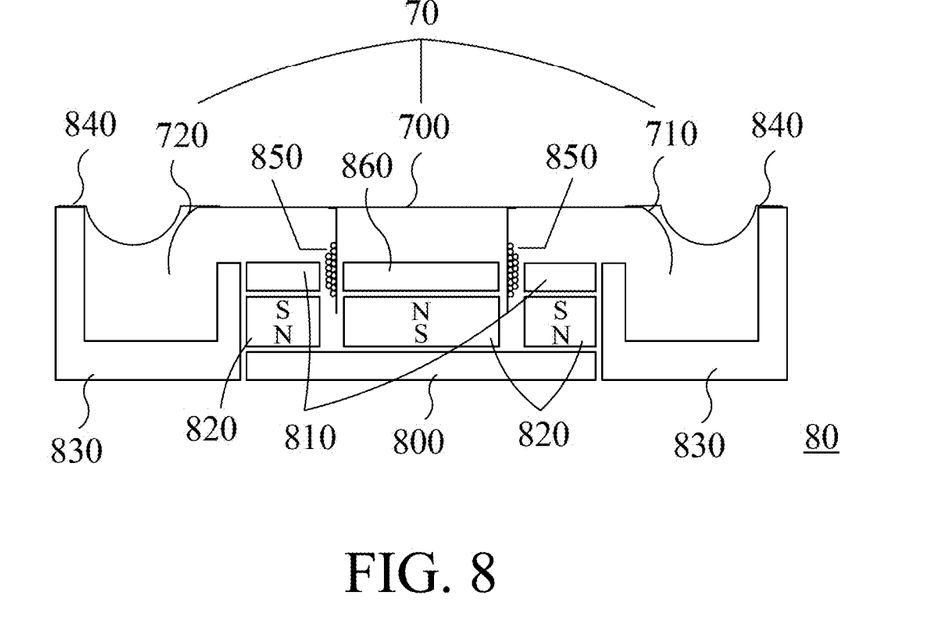
FIG. 8 is a schematic diagram illustrating application of a diaphragm structure according to the present invention to a speaker.

FIG. 8 schematically illustrates a speaker to which a diaphragm structure according to the present invention is adapted for use. In this example, the diaphragm 70 as illustrated in FIG. 7A, which has one pair of opposite bent regions 710 and 720 beside the flat region 700, is used for the speaker 80. Alternatively, the diaphragm 70 as illustrated in FIG. 7B, which has two pairs of opposite bent regions 710-740 beside the flat region 700, or any other suitable diaphragm shape, may also be used. As shown, the speaker 80 includes a back plate 800, a washer 810, a magnet 820, a frame 830, a surround 840, a voice coil 850, a top iron plate 860 and the diaphragm 70 or their equivalent variants. The flat region 700 of the diaphragm 70 entirely covers the magnet 820, and optionally extensively covers a portion of the frame 830 continuous with the magnet 820. It is preferred that the diaphragm 70 is kept isolated from stationary elements of the speaker such as the back plate 800, washer 810, magnet 820 and frame 830, and only in contact with the motional elements of the speaker 80 such as the surround 840 and voice coil 850. Moreover, it is preferred that the dimension of the bent regions 710 and 720 are consistent to that of the frame 830 and surround 840 in a manner that the bent regions 710 and 720 can be received in the space inherently constructed by these elements without increasing the overall thickness of the speaker.

In further embodiments, the diaphragms illustrated in FIGS. 1-6 and their equivalent variants may be used for the speaker in lieu of the diaphragm 70 or may constitute a portion of the diaphragm.

It is understood from the above embodiments, examples and descriptions that according to the present invention, at least a part of the diaphragm is made of hard and graded compression-tension boundary substantially homogeneous amorphous materials, such as silicon dioxide. Furthermore, new 3D variations and overall shapes are provided for achieving good sound quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the claims which are to be accorded with the broadest interpretation so as to encompass all such modifications and similar structures. For example, in addition to the above-described embodiments, the configurations of a diaphragm structure of a speaker according to the present invention may be selected from a variety of combinations of the following features, e.g. surface, overall curvature, and overall "bird's-eye view" shape bird's-eye view" shape of the diaphragm structure may be, for example, rectangular (including square), round, obround, or oval (including elliptical).

What is claimed is:

1. A diaphragm structure for use in a speaker, including a compressed skins-tensioned core structure, the compressed skins-tensioned core structure comprising:
   a first surface region;
   a second surface region;
   a core disposed between the first surface region and the second surface region;
   a first transition region continuous with the first surface region at a side, and continuous with the core at another side; and
   a second transition region continuous with the core at a side, and continuous with the second surface region at another side,
   wherein each of the first surface region, the second surface region, the core, the first transition region and the second transition region is formed of a substantially homogeneous amorphous material; each of the first surface region and the second surface region exhibits an internal compressive stress, the core exhibits an internal tensile stress, and each of the first transition region and the second transition region exhibits a stress gradient from the internal compressive stress to the internal tensile stress.

2. The diaphragm structure according to claim 1, wherein the internal compressive stress of the first surface region is substantially equal to the internal compressive stress of the second surface region.

3. The diaphragm structure according to claim 1, wherein the first transition region has a maximal internal compressive stress at an area approaching the first surface region, which is substantially equal to the internal compressive stress of the first surface region, and has a maximal internal tensile stress at an area approaching the core, which is substantially equal to the internal tensile stress of the core.

4. The diaphragm structure according to claim 1, wherein the second transition region has a maximal internal compressive stress at an area approaching the second surface region, which is substantially equal to the internal compressive stress of the second surface region, and has a maximal internal tensile stress at an area approaching the core, which is substantially equal to the internal tensile stress of the core.

5. The diaphragm structure according to claim 1, having an overall thickness ranged between 25 μm and 850 μm.

6. The diaphragm structure according to claim 2, wherein a thickness of the first surface region plus the first transition region or the second surface region plus the second transition region is preferably ranged between 1 μm and 40 μm, and a thickness of the core is preferably ranged between 20 μm and 800 μm.

7. The diaphragm structure according to claim 1, wherein the substantially homogeneous amorphous material includes silicon dioxide.

8. The diaphragm structure according to claim 1, being shaped with a flat region and at least two bent regions continuous with different sides of the flat region.

9. The diaphragm structure according to claim 8, wherein the at least two bent regions include two bent regions respectively contiguous with two opposite sides of the flat region.

10. The diaphragm structure according to claim 8, wherein the at least two bent regions include four bent regions respectively contiguous with two pairs of opposite sides of the flat region.

11. A composite diaphragm for a speaker, comprising:
    a first facesheet;
    a second facesheet; and
    a low-density core disposed between the first facesheet and the second facesheet,
    wherein at least one of the first facesheet and the second facesheet is the compressed skins-tensioned core having the structure as recited in claim 1.

12. The composite diaphragm according to claim 11, wherein the low-density core is formed of a material whose density is lower than the first facesheet and the second facesheet.

13. The composite diaphragm according to claim 11, wherein the low-density core is formed of a material selected from a group consisting of polymethacrylimide foam (PMI form), Balsa wood, and epoxy with a glass microspheres filler.

14. A composite diaphragm for a speaker, comprising:
    a first facesheet;
    a second facesheet; and
    a corrugated core disposed between the first facesheet and the second facesheet,
    wherein at least one of the first facesheet and the second facesheet is the compressed skins-tensioned core having the structure as recited in claim 1.

15. The composite diaphragm according to claim 14, wherein the corrugated core includes a plurality of first supporting portions, a plurality of second supporting portions, and a plurality of connecting portions, wherein the first supporting portions are adhered to the first facesheet, the second supporting portions are adhered to the second facesheet, and each of the connecting portions connects one of the first supporting portions to one of the second supporting portions to isolate the first supporting portions from the second facesheet and/or isolate the second supporting portions from the first facesheet.

16. The composite diaphragm according to claim 14, wherein corrugated core is made of an aluminum foil, a sheet of paper, or a polymer film.

\* \* \* \* \*